March 28, 1961
H. D. PUGH ET AL
2,977,561
HERMETICALLY SEALED ELECTRICAL COMPONENT
AND METHOD OF MAKING THE SAME
Filed April 27, 1959
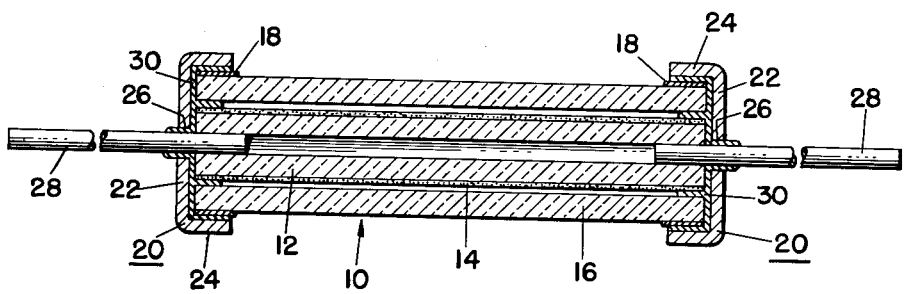
INVENTORS
HENRY D. PUGH
WILLARD E. HAUTH, JR.
BY
ATTORNEY 2,977,561
HERMETICALLY SEALED ELECTRICAL COMPONENT AND METHOD OF MAKING THE SAME Henry D. Pugh, Paoli, and Willard E. Hauth, Jr., Hatboro, Pa., assignors to International Resistance Company, Philadelphia, Pa.

Filed Apr. 27, 1959, Ser. No. 809,015

3 Claims. (Cl. 338—237)

This invention relates to a hermetically sealed electrical component and the method of making the same. More particularly, the present invention relates to a hermetically sealed electrical resistor, and the method of making the same.

The electrical properties of electrical components, such as electrical resistors, are adversely affected when the electrical component is subjected to high temperatures. To prevent such adverse affects on the electrical properties of an electrical component, it is desirable to hermetically seal the electrical component. Heretofore, electrical components have been hermetically sealed by enclosing the electrical component in a glass sleeve which is evacuated or filled with an inert gas. However, to hermetically enclose an electrical component in a glass sleeve and obtain a tight seal between the glass sleeve and the terminal wires of the electrical component which project through the glass sleeve is a difficult and expensive operation. Furthermore, such glass enclosed electrical components are fragile, and must be handled with great care. Electrical components have also been hermetically sealed in ceramic tubes. However, a major problem in this type of hermetically sealed component is in the sealing of the ends of the ceramic tubes through which the terminals of the electrical component project.

It is an object of the present invention to provide a novel hermetically sealed electrical component.

It is another object of the present invention to provide a hermetically sealed electrical resistor.

It is a further object of the present invention to provide a method of hermetically sealing an electrical resistor.

Other objects will appear hereinafter.

For the purpose of illustrating the invention there is shown in the drawings a form which is presently preferred; it being understood, however, that this invention is not limited to the precise arrangements and instrumentalities shown.

The figure is a longitudinal sectional view of the hermetically sealed electrical resistor of the present invention.

Referring to the drawing, the hermetically sealed resistor of the present invention is generally designated as 10.

The hermetically sealed resistor 10 comprises a tubular core 12 of an electrical insulating material, such as a ceramic. A layer 14 of an electrical resistance material, such as carbon or a metal, is coated over the entire outer surface of the core 12. A tubular sleeve 16 of a non-porous ceramic material surrounds the core 12. The inner diameter of the sleeve 16 is slightly larger than the outer diameter of the resistance layer 14 so as to provide a narrow space between the resistance layer 14 and the sleeve 16. Sleeve 16 has a thin metal band 18 coated around its outer surface adjacent each end thereof. The metal bands 18 are fused to the sleeve 16 so as to be strongly bonded thereto.

A separate metal cap 20 fits over each end of the sleeve 16. Each cap 20 has a flat base 22 which extends across an end of the sleeve 16 and core 12, and an angular flange 24 which surrounds a metal band 18. Each cap 20 has a hole 26 extending through the center of the base 22 of the cap 20. A separate lead wire 28 of an electrically conducted metal extends through the hole 26 in each cap 20, and extends a short distance into the core 12. The holes 26 in the caps 20 are slightly larger in diameter than the diameter of the lead wires 28.

Each of the caps 20 is secured to the sleeve 16 by a layer of a high temperature, hard solder 30. The layers of solder 30 extend between the base 22 of each of the caps 20 and the ends of the sleeve 16 and the core 12. The layers of solder 30 also extend between the flange 24 of each of the caps 20 and the metal bands 18 to mechanically secure the caps 20 to the sleeve 16, and to seal the space between the caps 20 and the sleeve 16. In addition, the layers of solder 30 extend for a short distance into the space between the sleeve 16 and the resistance layer 14 to seal the ends of the space. Also, the layers of solder 30 extend through the holes 26 in the caps 20 around the lead wires 28 to mechanically secure the lead wires 28 to the caps 20, and to seal the holes 26. Since the layers of solder 30 contact both the lead wires 28 and the resistance layer 14, the layers of solder 30 electrically connect the lead wires 28 to the ends of the resistance layer 14. Thus, the layers of solder 30 hermetically seal the caps 20 to the sleeve 16, hermetically seal the ends of the space between the sleeve 16 and the resistance layer 14, and hermetically seal the lead wires 28 to the caps 20. In addition, the layers of solder 30 mechanically secure the caps 20 to the sleeve 16, mechanically connect the lead wires 28 to the caps 20, and electrically connect the lead wires 28 to the resistance layer 14. The space between the sleeve 16 and the resistance layer 14 is filled with an inert gas, such as hydrogen, helium or argon.

The hermetically sealed resistor 10 of the present invention is assembled in the following manner:

The core 12 having the resistance layer 14 thereon is inserted in the sleeve 16. A lead wire 28 is inserted through the hole 26 in a cap 20. With the cap 20 being held facing vertically upwardly, the solder material either in powdered form or as a preformed washer is placed in the cap 20. One end of the sleeve 16 and core 12 assembly is inserted in the cap 20 over the solder material with the lead wire 28 being inserted in the core 12. While pressing the sleeve 16 and core 12 assembly against the base 22 of the cap 20, the solder material is heated, such as by induction heating. When the solder material becomes molten, it flows along the base 22 of the cap 20. The pressure between the sleeve 16 and core 12 assembly and the base 22 of the cap 20 causes the liquid solder to flow upwardly between the flange 24 of the cap 20 and the metal band 18 on the outer surface of the sleeve 16. The liquid solder is also forced upwardly between the sleeve 16 and the resistance layer 14. In addition, the liquid solder will flow downwardly through the hole 26 in the cap 20 around the lead wire 28. The solder is then cooled to permit it to harden, and thus provide the layer of solder 30. The space between the sleeve 16 and the resistance layer 14 is then filled with the inert gas, and a cap 20 and lead wire 28 is secured to the other end of the sleeve 16 and core 12 in the same manner as described above.

The present invention may be embodied in other specific forms without departing from the spirit or essential attributes thereof and, accordingly, reference should be made to the appended claims, rather than to the foregoing specification as indicating the scope of the invention.

We claim:

1. A hermetically sealed electrical component comprising a tubular core, a non-porous ceramic sleeve surrounding said core, a separate metal band bonded to and extending around the outer surface of said sleeve at each end of said sleeve, a separate cap fitting over each end of the sleeve, each of said caps having a base extending across the end of the sleeve and the end of the core and an annular flange surrounding at least a portion of the metal band on the outer surface of the sleeve, the base of each of said caps having a hole therethrough, a separate lead wire extending through the hole in the base of each of said caps and projecting into said core, and a separate layer of solder securing each of said caps to said sleeve, said layers of solder extending between the flange of the caps and the metal bands on the outer surface of said sleeve, between the base of the caps and the ends of the sleeve and core, a short distance between the sleeve and the core from each end of the core, and through the holes in the base of said caps and around the lead wires.

2. A hermetically sealed electrical resistor comprising a tubular core of an electrical insulating material, a layer of an electrical resistance material covering the outer surface of said core, a non-porous ceramic sleeve surrounding the core, the inner surface of said sleeve being spaced from the resistance material layer, a separate metal band bonded to and extending around the outer surface of said sleeve at each end of said sleeve, a separate cap fitting over each end of said sleeve, each of said caps having a base extending across the end of the sleeve and the end of the core and an annular flange surrounding at least a portion of the metal band on the outer surface of the sleeve, the base of each of said caps having a hole therethrough, a separate lead wire extending through the hole in the base of each of said caps and projecting into said core, and a separate layer of solder securing each of said caps to said sleeve, said layers of solder extending between the flange of the caps and the metal bands on the outer surface of said sleeve, between the base of the caps and the ends of the sleeve and core, a short distance between the sleeve and the core from each end of the core, and through the holes in the base of said caps and around the lead wires.

3. A hermetically sealed electrical resistor in accordance with claim 2 in which the space between the sleeve and the resistance material layer is filled with an inert gas.

References Cited in the file of this patent
UNITED STATES PATENTS

| | | |
|---|---|---|
| 1,676,745 | Pickard | July 10, 1928 |
| 2,332,255 | Podolsky | Oct. 19, 1943 |
| 2,416,599 | Victoreen | Feb. 25, 1947 |